United States Patent [19]

Shiba et al.

[11] 4,243,455
[45] Jan. 6, 1981

[54] METHOD OF FORMING ELECTRODE CONNECTOR FOR LIQUID CRYSTAL DISPLAY DEVICE

[75] Inventors: Hiroshi Shiba; Katsuhiro Murata, both of Ohtsu, Japan

[73] Assignee: Nippon Graphite Industries, Ltd., Ohtsu, Japan

[21] Appl. No.: 926,341

[22] Filed: Jul. 20, 1978

[30] Foreign Application Priority Data

Jul. 29, 1977 [JP] Japan .................................. 52-90505
Oct. 14, 1977 [JP] Japan ................................ 52-123072

[51] Int. Cl.³ ............................................. B65H 81/00
[52] U.S. Cl. .................................. 156/187; 29/592 R;
156/191; 156/194; 156/198; 156/215; 156/256;
156/278; 156/312; 313/355; 339/275 C;
339/278 D; 350/336; 428/1; 428/36; 428/913
[58] Field of Search .................. 156/64, 215, 187, 256,
156/191, 278, 194, 312, 198; 427/208, 210, 286;
428/1, 913, 36, 354, 349, 355; 260/37 M;
252/511, 512, 408 LC; 350/336; 339/275 C,
278 D; 29/592 R; 313/355

[56] References Cited

U.S. PATENT DOCUMENTS

| 1,455,188 | 5/1923 | Cox ........................................ 156/194 |
| 2,986,671 | 5/1961 | Kerstetter et al. .................... 156/215 |
| 3,003,975 | 10/1961 | Louis ................................... 252/514 |
| 3,359,145 | 12/1967 | Salyer et al. .......................... 252/511 |
| 3,577,293 | 5/1971 | Ritterhoff ............................. 156/187 |
| 3,762,946 | 10/1973 | Stow et al. ........................... 428/354 |
| 3,968,056 | 7/1976 | Bolon et al. .......................... 428/913 |

FOREIGN PATENT DOCUMENTS

50-6758 1/1975 Japan .

*Primary Examiner*—John J. Gallagher
*Attorney, Agent, or Firm*—Ladas & Parry

[57] ABSTRACT

An improved simple and cheap method of forming electrode connector for liquid crystal display device has been found. This novel method eliminates difficulties in complicated compression molding process required a high accuracy of dimensions in a molded electrode connector. This method comprises the four steps of (A) printing a plurality of parallel conductive strips with a predetermined width and interval for the electrode connector on one side of a sheet of flexible polyester film with a special suspension ink and drying the printed ink on said polyester film, (B) applying a hot-setting adhesive suspension all over the other side of said polyester film by spraying or printing process, and drying a thin layer of said adhesive suspension on said polyester film, (C) cutting a rectangular piece having the desired size out of the resulting film having an adhesive coating layer on the surface in the step (B), and (D) putting a length of film with the adhesive layer coated on the upper side thereof on a flat plate heated at the temperature of 100°–200° C., and rolling a rubber tube having a small diameter on said film in the direction of said vertical strips printed on the lower side so as to adhere said film around said rubber tube.

Furthermore, this method comprises the five steps of the above-mentioned (A), (B), (C), (D), and (E) laterally hot-pressing said cylindrical electrode connector obtained in the step of (D) on a hot plate heated at the temperature of 100°–200° C. so as to mold into a cylindrical electrode connector having a desired thickness in an elliptic section by using a thickness gauge.

2 Claims, 7 Drawing Figures

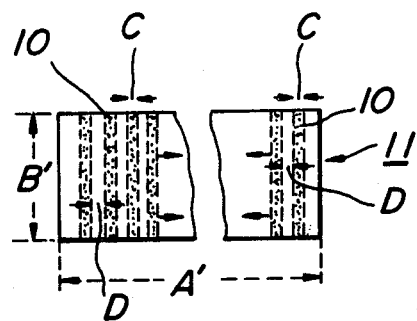
FIG._3
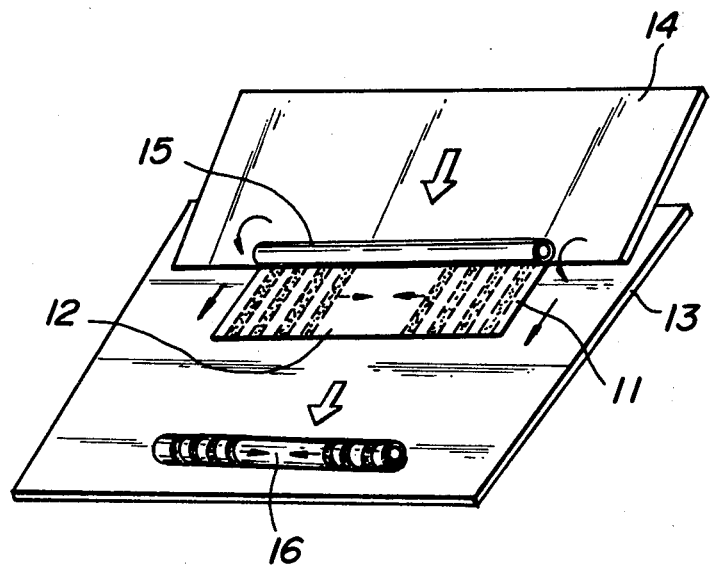
FIG._4

METHOD OF FORMING ELECTRODE CONNECTOR FOR LIQUID CRYSTAL DISPLAY DEVICE

BACKGROUND OF THE INVENTION

1. Field of the Invention

This invention relates to an improved method of forming electrode connector for liquid crystal display device, and more particularly to a simple and cheap method of forming electrode connector for liquid crystal display device which eliminate difficulties in complicated compression molding process required a high accuracy of dimensions by using a special suspension ink for printing containing conductive fine particles, a flexible base film and a fine rubber tube, without a complicated compression molding process required a high accuracy of dimensions such as a method of forming electrode connector molded by silicone rubber in which both a thin conductive part and a thin insulating part are superposed each other layer by layer and stuck together by compressing into one integral body with predetermined thickness.

2. Description of the Prior Art

In the conventional method of manufacturing the electrode connector for liquid crystal display device, the conductive rubber molding materials are first prepared by mixing of silicone rubber raw materials and conductive powder materials such as carbon black powder and the like. The conductive rubber molding materials are then molded into the predetermined shape by a hot press so as to form the thin rectangular shape with the desired thickness, for example, such as the conductive parts 1 shown in FIG. 1. In the same manner, the above-mentioned silicone rubber raw materials alone (without conductive powder materials) are molded into the predetermined shape by a hot press so as to form the similar thin rectangular shape with the desired thickness, for example, such as the insulating parts 2 shown in FIG. 1. After a silicone rubber adhesive is applied to the contacting surfaces 3 to be joined of both the conductive parts 1 and the insulating parts 2, both the conductive parts 1 and the insulating parts 2 are superposed upon each other layer by layer, and stuck together forming one integral part with the predetermined thickness. Subsequently the above-mentioned integral part is cut into the desired size and the conventional electrode connector 4 shown in FIG. 1 is formed. As shown in FIG. 1, this electrode connector 4 is placed on the electrodes 8 of the liquid crystal section 7, which consist of indium oxide film and the like formed at predetermined regular intervals along the edge 6 of the glass plate 5. The conductive parts 1 in the electrode connector 4 are then connected with the corresponding electrodes 8 while the conductive parts 1 on the top of the electrode connector 4 are contacted with the predetermined source of current (not shown).

However, in the conventional method, the dimensions of the molded conductive rubber 1 cannnot be accurately controlled, and satisfactory accuracy of the dimensions can not be obtained. In addition, good conductive rubber parts 1 can not be obtained. Accordingly, the electrode connector 4 having a fine structure can only be formed with difficulty and a large number of rejects are formed in assembly. For example, it is very difficult and expensive to mold and form the conductive rubber parts 1 having a fine pitch of 0.1–0.2 mm. Furthermore, due to one integral body of the molded conductive rubber-insulating rubber, the electrode connector has poor elasticity and insufficient contact with the electrodes 8 of the liquid crystal display device.

A need exists, therefore, for a simple and cheap method of forming an electrode connector for liquid crystal display device which can avoid the difficulties of the prior art methods.

SUMMARY OF THE INVENTION

Accordingly, it is one object of the invention to provide an improved and very simple method of forming an electrode connector for liquid crystal display device having a good elasticity and a high accuracy of dimensions.

Another object of the invention is to provide a cheap method of forming electrode connector for liquid crystal display device without a complicated compression molding step.

This and other objects have now been attained by providing a method including the four steps of (A) printing a plurality of parallel conductive strips with a predetermined width and interval for the electrode connector on one side of a sheet of flexible polyester film with a special suspension ink and drying the printed ink on said polyester film, (B) applying a hot-setting adhesive suspension all over the other side of said polyester film by spraying or printing process, and drying a thin layer of said adhesive suspension on said polyester film, (C) cutting a rectangular piece having the desired size out of the resulting film having an adhesive coating layer on the surface in the step (B), and (D) putting a length of film with the adhesive layer coated on the upper side thereof on a flat plate heated at the temperature of 100°–200° C., and rolling a rubber tube having a small diameter on said film in the direction of said vertical strips printed on the lower side so as to adhere said film around said rubber tube.

Further, this and other objects have now herein been attained by providing a method including the above four steps of the above-mentioned (A), (B), (C), (D), and step (E) laterally hot-pressing said cylindrical electrode connector obtained in the step of (D) on a hot plate heated at the temperature of 100°–200° C. so as to mold into a cylindrical electrode connector having a desired thickness in an elliptic section by using a thickness gauge.

BRIEF DESCRIPTION OF THE DRAWINGS

In the drawings,

FIG. 3 shows schematically an enlarged and partially cut-away plan view of the polyester film cut and formed into the desired size in step (C) according to the invention (shown a hot-setting adhesive layer on the surface, and the printed electroconductive strips for electrode connector in the rear);

FIG. 4 shows diagrammatically an enlarged perspective view illustrating step (D) of winding with several turns of the film around a thin rubber pipe according to the invention;

DETAILED DESCRIPTION OF THE INVENTION

According to the invention, a method of forming an electrode connector for liquid crystal display device comprises the four steps of (A) printing a plurality of parallel electroconductive strips with a predetermined width and interval for the electrode connector on one side of a sheet of flexible polyester film with a special suspension ink and drying the printed ink on said polyester film; (B) applying a thin layer of hot-setting adhesive suspension all over the other side of said polyester film by a spraying or printing process, and drying this layer of adhesive suspension on said polyester film; (C) cutting a rectangular piece having the desired size out of the resulting film having an adhesive coating layer on the surface in the step of (B); and (D) putting a length of film with the adhesive layer coated on the upper side thereof on a flat plate heated at the temperature of 100°–200° C., and rolling a rubber tube having a small diameter on said film in the direction of said vertical strips printed on the lower side so as to adhere said film around said rubber tube.

Moreover, according to the invention, a method of forming an electrode connector for liquid crystal display device comprises steps (A), (B), (C), and (D), and additionally step (E) laterally hot-pressing said cylindrical electrode connector obtained in step (D) on a hot plate heated at the temperature of 100°–200° C. so as to mold into a cylindrical electrode connector having a desired thickness in an elliptic section by using a thickness gauge.

The special suspension ink for printing in step (A) is prepared by mixing together, dissolving and dispersing (a) 20–80% by weight of at least one fine powder selected from the group consisting of graphite powder having a grain size of 0.1–60μ, carbon black powder having a grain size of less than 0.1μ, and silver powder having a grain size of 0.1–60μ, (b) 5–30% by weight of at least one binding material of rubber and thermoplastic resin selected from the group consisting of chloroprene rubber, chlorosulphonated rubber, polyurethane resin and polyester resin and (c) 15–80% by weight of at least one organic solvent selected from the group consisting of dimethyl formamide, dimethyl acetamide, diethyl carbitol, buthyl carbitol, isophorone and turpentine oil, and has an apparent specific gravity of 0.9–1.9 and an apparent viscosity of 150–1,200 poise. A suspension (a+b+c) is thus prepared as the special dispersed ink containing fine powders of electroconductive materials and having a suitable viscosity for printing.

Figure 1:
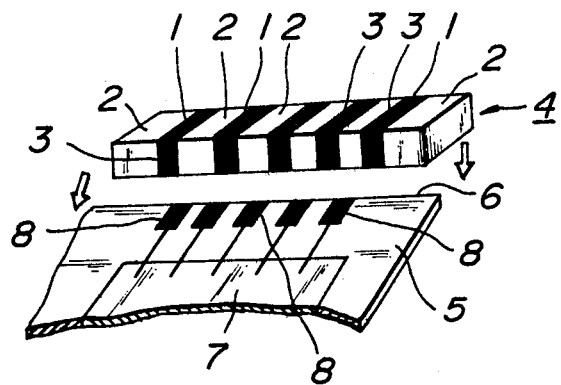
FIG. 1 shows schematically an enlarged perspective view of an example of a conventional electrode connector for liquid crystal display device.
Figure 2:
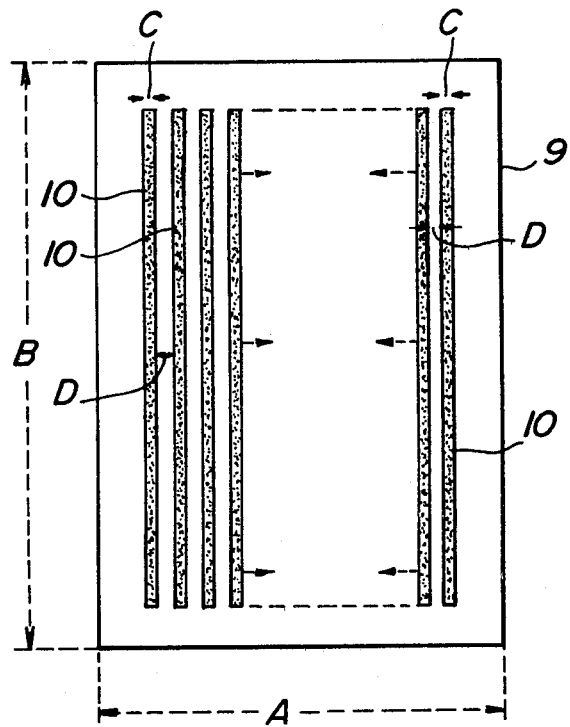
FIG. 2 shows schematically an enlarge plan view of a sheet of polyester film on one side of which a plurality of parallel electroconductive strips of narrow width are printed with the special dispersed ink in step (A) according to the invention.

As shown in FIG. 2, with the resulting ink a plurality of parallel electroconductive strips 10 with a predetermined width C and interval D, namely circuit patterns for the electrode connector are printed on one side of a sheet of flexible polyester film 9 with thickness 10–35μ by a conventional printing process such as screen printing, gravure printing or the like. These vertical strips 10 are printed so as to be adapted to contact the terminal strips 20 on a connector board 17 (see FIG. 5 or FIG. 7; numeral reference 20 represents the electrodes of the liquid crystal display device 19 and consists of an indium oxide film 20 on the surface of the glass base plate 17.). Thereafter, the ink is dried at the temperature of 80°–150° C. for 10–30 minutes (step (A)).

In FIG. 2, reference A represents the width of the base polyester film 9, namely 30–300 mm. Reference B is the length of the base polyester film 9, namely 50–500 mm. Reference C is the width of the electroconductive strips 10, namely 0.1–3.0 mm. Reference D represents the spacing between the electroconductive strips 10, namely 0.1–3.0 mm.

In the composition of the above-mentioned suspension ink (a+b+c), when the quantity of the graphite powder, the carbon black powder and the silver powder exceeds 80% by weight, the suspension ink becomes unstable, and has weak adhesion to the base film in the printing process and thus poor printability. On the contrary, when the above quantity is under 20% by weight, the printed strips on the base film have poor conductivity. When the grain or particle size of the graphite powder and the silver powder exceeds 60μ, the suspension ink becomes unstable, and has weak adhesion to the base film in the printing process and poor printability. The printed strips on the base film have poor conductivity. When the grain size of the carbon black powder exceeds 0.1μ, it is generally very difficult to obtain the powder on the market. Even though the grain size of the carbon black powder is under 0.1μ, it is suitable for printing.

For the above binding material (b) of rubber and thermoplastic resin, for example, chloroprene rubber manufactured by Showa Neoprene K. K. under the trade name of "Neoprene WRT·WT" may be used. Chlorosulphonated rubber manufactured by E. I. DuPont de Nemours & Company U.S.A. under the trade name of "Hypalon No. 30-40" may be used. Ethylene-vinyl acetate copolymer resin manufactured by Seitetsu Chemical Company Ltd. under the trade name of "Flowback D-5010" may be used. Polyurethane resin manufactured by Nippon Polyurethane Company Ltd. under the trade name of "Paraprene 22S·25S" may also be used. When the binding material (b) is under 5% by weight, the suspension ink become unstable, and has weak adhesion to the base film in the printing process. When the content exceeds 30% by weight, the printed strips on the base film have poor conductivity.

In the preparation of the suspension ink, the predetermined contents of raw materials (a), (b) and (c) are mixed together, dissolved and dispersed by stirring. The resulting suspension ink has an apparent specific gravity of 0.9–1.9 and an apparent viscosity of 150–1,200 poise. In this case, when the apparent specific gravity of the resulting suspension ink is under 0.9 the contents of graphite, carbon black and silver powder are insufficient, so that poor conductivity is brought to the strip on the base film. When the apparent specific gravity exceeds 1.9, the suspension ink becomes unstable and has weak degree of dispersion and poor adhesion to the base film in printing process. When the apparent viscosity is under 150 poise, the suspension ink has poor printability. When the apparent viscosity exceeds 1,200 poise, poor dispersion and printability are manifest.

The hot-setting adhesive suspension in step (B) is prepared by mixing together, dissolving and dispersing (i) 30–60% by weight of at least one hot-setting adhesive resin selected from the group consisting of chloroprene rubber-phenol resin, ethylene-vinyl acetate copolymer resin and polyester resin, (ii) 1-10% by weight of at least one fine powder selected from the group consisting of aluminum powder, iron oxide powder and sericite powder and (iii) 30-70% by weight of at least one organic solvent selected from the group consisting of toluene, xylene, ethyl acetate, isophorone, butyl carbitol and diethyl carbitol, and has an apparent specific gravity of 0.9-1.3 and an apparent viscosity of 100-800 poise.

In the composition of the hot-setting adhesive suspension, when the content of the hot-setting resin is under 30% by weight the suspension has weak adhesion to the base film and low viscosity. When the content exceeds 60% by weight the suspension is too viscous to apply to the base film.

For the above hot-setting adhesive resin (i), for example, chloroprene rubber-phenol resin manufactured by Showa High Molecular Chemical Company Ltd. under the trade name of "Binylol 2200, 2700 and 2205" etc. may be used. Ethylene-vinyl copolymer resin manufactured by Seitetsu Chemical Company Ltd. under the trade name of "Flowback D-5010," and polyester resin manufactured by TOYOBO Co., Ltd. under the trade name of "Bylon No. 200, No. 300" etc. may be used.

In the preparation of the hot-setting adhesive suspension, the predetermined contents of the raw materials (i+ii+iii) are mixed together, dissolved and dispersed by stirring. The resulting hot-setting adhesive suspension has an apparent specific gravity of 0.9-1.3 and an apparent viscosity of 100-800 poise. When the apparent specific gravity of the resulting suspension is below 0.9 the contents of aluminum powder, iron oxide powder and sericite powder are insufficient, so that hot-setting adhesion to the rubber tube surface becomes very poor. When the apparent specific gravity of the resulting suspension exceeds 1.3, the suspension becomes unstable and has weak degree of suspension and poor adhesion to the base film in printing process. When the apparent viscosity is under 100 poise, the suspension has poor adhesion to the base film. When the apparent viscosity exceeds 800 poise, it is difficult to apply the suspension to the base film by printing process.

Thus, after applying the above-mentioned hot-setting adhesive suspension all over the other side of the base film by spraying or by screen or gravure printing, the resulting thin layer of said adhesive suspension on said film is dried at the temperature of 50°-120° C. for 10-30 minutes (step (B)).

Subsequently, as shown in FIG. 3, a rectangular piece 11 (A'×B') is cut out of the resulting film having an adhesive coating layer on its surface. Length (A') of the rectangular piece 11 is somewhat larger than the length of rubber tube 15 to be used in step (D), and width (B') of the rectangular piece 11 is somewhat larger than the circumference of the rubber tube 15.

The rectangular film piece 11 with the adhesive layer 12 coated on its upper side and with a plurality of parallel electroconductive strips 10 printed on its lower side is put on a flat plate 13 heated at the temperature of 100°-200° C., and a hollow rubber tube 15 is rolled on said film piece 11 in the direction of said vertical strips 10 printed on the lower side so as to adhere said film piece 11 around said rubber tube 15 (step (D)).

As shown in FIG. 4, the rubber tube 15 may be easily rolled down and adhered to the hot-setting adhesive layer 12 of the film 11 by using a guide glass plate 14 held at an angle of inclination (step (D)).

Rubber tube 15 is made of silicone rubber, chloroprene rubber or natural rubber, and has a size of 1.0-4.0 mm in outer diameter, 0.5-2.0 mm in inner diameter and 10-100 mm in length.

As rubber tube, silicone rubber tube manufactured by the Shin-Etsu Chemical Industry Co., Ltd. under the trade name of "No. 151 silicon rubber tube" may be used. It is generally easy to obtain silicone rubber tube having the size of 0.4-3.5 mm in inner diameter, 0.8-4.0 mm in outer diameter and 10-100 mm in length on the market.

When the outer diameter of the rubber tube is below 1.0 mm, the electrode connector composed of this rubber tube is insufficient in contact with the electrodes of the liquid crystal display device. When the outer diameter of the rubber tube exceeds 4.0 mm, it is too thick and improper for use of the connector. When the inner diameter of the rubber tube is below 0.5 mm, the tube is insufficient in elasticity and the connector is improper in contact with the electrodes. When the inner diameter of the rubber tube exceeds 2.0 mm, the tube is too large in elasticity and on the contrary it is improper for use of the connector. The electrode connector composed of this rubber tube is insufficient in contact with the electrodes of the liquid crystal display device. The electrode connector is fully worked by the action of proper elasticity and deformation of the rubber tube to be used.

In short, this invention comprises the above-mentioned four steps of (A+B+C+D).

As shown in FIG. 2, in step (A), a plurality of electroconductive vertical strips 10 with a predetermined width C and interval D are printed on one side of a flexible polyester base film 9 with thickness 15-35μ. In step (B), a hot-setting adhesive suspension is applied all over the other side of said polyester base film 9 and a hot-setting adhesive thin layer is formed on the other side of said film 9.

As shown in FIG. 3, in step (C), a rectangular film piece having the desired size of (A'×B') is cut out of the above base film.

As shown in FIG. 4, in step (D), a length of film 11 with the adhesive layer 12 coated on its upper side and with a plurality of electroconductive vertical strips 10 printed on its lower side is put on a flat plate 13 heated at the elevated temperature.

Figure 6:
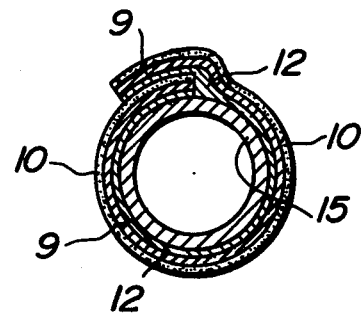
FIG. 6 shows diagrammatically an enlarged transverse sectional view of an electrode connector according to another embodiment of the invention.

A rubber tube or pipe 15 is rolled on said film 11 in the longitudinal direction of said vertical strips 10 so as to adhere said film 11 around said rubber tube 15 with or without a guide plate 14. After hot-setting and adhering of said film 11 to said rubber tube 15, an electrode connector 16 provided with electroconductive strips 10 on the circumference of the cylindrical tube surface is formed according to the invention. FIG. 6 shows diagrammatically an enlarged transverse sectional view of an embodiment of the invention.

Moreover, in step (E) of the invention, the cylindrical electrode connector obtained in step (D) is laterally hot-pressed on a hot stainless steel plate or the like heated to a temperature of 100°-200° C. so as to mold into a cylindrical electrode connector having a desired thickness in an elliptic section by using a thickness gauge.

When said heating temperature is below 100° C., it takes a long time for hot-pressing and molding. When said heating temperature exceeds 200° C., a bad effect is sometimes obtained upon the polyester base film itself.

The hot-pressed and molded electrode connector is allowed to cool to room temperature.

Figure 7:
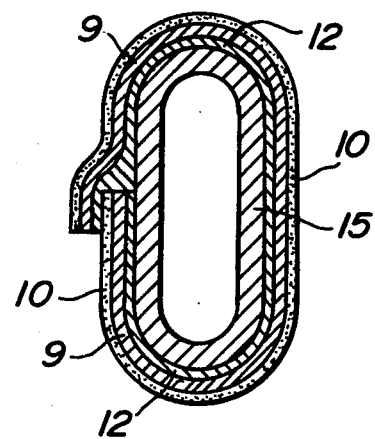
FIG. 7 shows diagrammatically an enlarged transverse sectional view of an electrode connector according to yet another embodiment of the invention.

FIG. 7 shows diagrammaticaly an enlarged transverse sectional view of an electrode connector according to another embodiment of the invention.

The electric resistance of the electrode connector for liquid crystal display device according to the invention is less than 1.3 kΩ per one of electrode conductor, so that the electrode connector can be satisfactorily used for circuit parts of liquid crystal display device. This electrode connector has good elasticity owing to using a hollow-rubber tube having a small diameter as the body. The circuit patterns can be printed with high accuracy by screen printing and similar processes, so that without an accurate molding process the electrode connector can be advantageously manufactured with higher accuracy of dimensions than that of the conventional electrode connector for liquid crystal display device.

EXAMPLE 1

(a) 30% by weight of graphite powder having a grain size of 0.1–60μ and 15% by weight of carbon black powder having a grain size of less than 0.1μ, (b) 25% by weight of polyurethane resin, namely manufactured by Nippon Polyurethane Company Ltd. under the trade name of "Paraprene 22S", and (c) 30% by weight of isophorone were mixed together and dissolved. As a result, a suspension (a+b+c) was prepared as the special dispersed ink containing electroconductive materials and having a suitable viscosity for printing. As shown in FIG. 2, with the resulting ink a plurality of parallel electroconductive strips 10 with width C and spacing D, were printed on one side of a sheet of polyester film 9 with thickness 25μ by the conventional screen printing process, and the ink was dried at the temperature of 100° C. for 15 minutes (step (A)).

In FIG. 2, the base polyester film 9 has a width of 30–300 mm and a length (B) of 50–500 mm. C is the width of the electroconductive strips 10, namely 0.1–3.0 mm. Reference D is the spacing of the electroconductive strips 10, namely 0.1–3.0 mm.

(i) 40% by weight of chloroprene rubberphenol resin (manufactured by Shows High Molecular Chemical Company Ltd. under the trade name of "Binylol 2000"), (ii) 5% by weight of aluminum powder and (iii) 55% by weight of toluene were mixed together and dissolved. As a result, a hot-setting adhesive suspension (i+ii+iii) having a suitable viscosity was prepared for coating. After applying the hot-setting adhesive suspension all over the other side of the above film by gravure printing, the resulting thin layer of said adhesive suspension on the film was dried at the temperature of 110° C. for 10 minutes (step (B)).

Subsequently, as shown in FIG. 3, a rectangular piece 11 7.0 mm in width and 52.4 mm in length was cut out of the resulting film having an adhesive coating layer on its surface. In the FIG. 3, numeral reference 11 represents the film cut and formed into the desired size in the step (C) (shown a hot-setting adhesive layer on the surface, and the printed electroconductive strips for electrode connector in the rear). The width (A') of the film 11 cut out of the base film 9 is 10–100 mm. The length B' of the film 11 cut out of the base film 9 is 3–15 mm.

As shown in FIG. 4, a length of film 11 with the adhesive layer 12 coated on its upper side was put on a flat iron plate 13 heated at the temperature of 140° C., and a silicone rubber tube 15 having the size of 2.0 mm in outer diameter and 0.5 mm in inner diameter was rolled on said film 11 in the longitudinal direction of said strips 10 printed on the lower side so as to adhere said film 11 around the rubber tube 15. In this case, as shown in FIG. 4, the rubber tube 15 may be easily rolled down and adhered to the hot-setting adhesive layer 12 (the surface in the figure) of the film 11 by using a guide glass plate 14 with an angle of inclination (step (D)).

Thus, the tube 16 obtained in this step had an electric resistance of 1.0 KΩ, sufficient elasticity in the direction of its diameter, and excellent properties of electrode connector for liquid crystal display device. In practice, it was favorably suitable for use of electrode connector for liquid crystal display device.

Moreover, instead of the above-mentioned polyurethane resin in step (A), chloroprene rubber (manufactured by Showa Neoprene K.K. under the trade name "WRT"), chlorosulphonated rubber (manufactured by E. I. DuPont de Nemours & Company U.S.A. under the trade name of "Hypalon No. 30") and ethylene-vinyl acetate copolymer resin (manufactured by Seitetsu Chemical Company Ltd. under the trade name "Flowback D-5010") may be used with substantially similar effect.

EXAMPLE 2

(a) 20% by weight of graphite powder having a grain size of 0.1–60μ and 40% by weight of silver powder having a grain size of 0.1–60μ, (b) 20% by weight of polyurethane resin, namely by Nippon Urethane Company Ltd. under the trade name of "Paraprene 25S", and (c) 20% by weight of butyl carbitol were mixed together and dissolved. As a result, a suspension (a+b+c) was prepared as the special dispersed ink having a viscosity for printing. As shown in FIG. 2, with the resulting ink a plurality of parallel electroconductive strips with a predetermined width and interval, namely circuit patterns for the electrode connector were printed on one side of a sheet of polyester film with thickness 25μ by the conventional screen printing process, and the above ink was dried at the temperature of 100° C. for 15 minutes (step (A)).

In this case, the references of A, B, C and D in FIG. 2 also represent the same as in Example 1.

(i) 40% by weight of polyester resin (manufactured by TOYOBO Co., Ltd. under the name of Bylon No. 300), (ii) 3% by weight of aluminum powder and (iii) 57% by weight of isophorone were mixed together and dissolved. As a result, a hot-setting adhesive suspension (i+ii+iii) having a suitable viscosity was prepared for coating. After applying the hot-setting adhesive suspension all over the other side of the above film by screen printing process, the resulting thin layer of said adhesive suspension on said film was dried at the temperature of 110° C. for 10 minutes (step (B)).

Subsequently, as shown in FIG. 3, a rectangular piece 11 having the size of 7.0 mm in width (B') and 52.4 mm in length (A') was cut out of the resulting film having an adhesive coating layer on its surface.

As shown in FIG. 4, a length of film 11 with the adhesive layer 12 coated on the upper side thereof was then put on a flat iron plate 13 heated at the temperature of 110° C., and a silicone rubber tube 15 having the size of 2.0 mm in outer diameter and 0.5 mm in inner diameter was rolled on said film 11 in the direction of said strips 10 printed on the lower side so as to adhere said film 11 around the rubber tube 15. In this case, as shown in FIG. 4, the rubber tube 15 may be easily rolled down and adhered to the hot-setting adhesive layer 12 (the surface in the figure) of the film 11 by using a guide glass plate 14 with an angle of inclination (step (D)).

Thus, the tube 16 obtained in this step had electric resistance of 0.8 kΩ, sufficient elasticity in the direction of its diameter, and excellent properties of electrode connector for liquid crystal display device. In practice, it was favorably suitable for use of electrode connector for liquid crystal display device.

Moreover, instead of the above-mentioned polyurethane resin in step (A), chloroprene rubber (manufactured by Showa Neoprene K.K. under the trade name "WRT"), chlorosulphonated rubber (manufactured by E. I. DuPont de Nemours & Company U.S.A. under the trade name of "Hypalon No. 30") and ethylene-vinyl acetate copolymer resin (manufactured by Seitetsu Chemical Company Ltd., under the trade name "Flowback D-5010") may be used with substantially similar effect.

EXAMPLE 3

(a) 20% by weight of graphite powder having a grain size of 0.1–60μ and 20% by weight of carbon black powder having a grain size of less than 0.1μ, (b) 20% by weight of polyurethane resin, namely manufactured by Nippon Urethane Company Ltd., under the trade name of "Parapren 22S", and (c) 40% by weight of dimethyl formamide were mixed together and dissolved. As a result, a suspension (a+b+c) was prepared as the special dispersed ink having a suitable viscosity for printing. As shown in FIG. 2, with the resulting ink a plurality of parallel electroconductive strips with a predetermined width and spacing, were printed on one side of a sheet of polyester film with thickness 25μ by the conventional screen printing process, and the ink was dried at the temperature of 100° C. for 15 minutes (step (A)).

(i) 60% by weight of chlorprene rubber-phenol resin (manufactured by Shows High Molecular Chemical Company Ltd., under the trade name of "Binylol 2700"), (ii) 3% by weight of aluminum powder and (iii) 37% by weight of butyl carbitol were then mixed together and dissolved. As a result, a hot-setting adhesive suspension (i+ii+iii) having a suitable viscosity was prepared for coating. After applying the hot-setting adhesive suspension all over the other side of the above film by a screen printing process, the resulting thin layer of said adhesive suspension on said film was dried at the temperature of 110° C. for 10 minutes (step (B)).

Subsequently, as shown in FIG. 3, a rectangular piece 11 having the size of 7.0 mm in width (B') and 52.4 mm in length (A') was cut out of the resulting film having an adhesive coating layer on the surface in step (B).

At last, as shown in FIG. 4, a length of film 11 with the adhesive layer 12 coated on the upper side thereof was placed on a flat iron plate 13 heated at the temperature of 150° C., and a silicon rubber tube 15 having the size of 2.0 mm in outer diameter and 0.5 mm in inner diameter was rolled on said film 11 in the longitudinal direction of said strips 10 printed on the lower side so as to adhere said film 11 around the rubber tube 15. In this case, as shown in FIG. 4, the rubber tube 15 may be easily rolled down and adhesive layer 12 (the surface in the figure) of the film 11 by using a guide glass plate 14 with an angle of inclination in the same manner as Example 1 (step (D)).

Thus, the tube 16 obtained in this step had electric resistance of 0.6 kΩ, sufficient elasticity in the direction of its diameter, and excellent properties of electrode connector for liquid crystal display device. In practice, it was suitable for use as electode connector for liquid crystal display device.

In addition, instead of the above-mentioned polyurethane resin in step (A), chloroprene rubber (Manufactured by Showa Neoprene K.K. under the trade name "WRT"), chlorosulphonated rubber (manufactured by E. I. DuPont de Nemours & Company U.S.A. under the trade name "Hypalon No. 30") and ethylene-vinyl acetate copolymer resin (manufactured by Seitetsu Chemical Company Ltd., under the trade name "Flowback D-5010") may be used with substantially similar effect.

EXAMPLE 4

(a) 10% by weight of graphite powder having a grain size of 0.1–60μ and 50% by weight of silver powder having a grain size of 0.1–60μ, (b) 20% by weight of polyurethane resin, namely by Nippon Urethane Company Ltd., under the trade name of "Parapren 25S", and (c) 20% by weight of butyl carbitol were mixed together and dissolved. As a result, a suspension (a+b+c) was prepared as the special dispersed ink having a viscosity for printing. As shown in FIG. 2, with the resulting ink a plurality of parallel electroconductive strips with a predetermined width and interval, namely circuit patterns for the electrode connector were printed on one side of a sheet of polyester film with thickness 25μ by the conventional screen printing process, and the above ink was dried at the temperature of 100° C. for 15 minutes (step (A)).

(i) 60% by weight of chlorprene rubber-phenol resin (manufactured by Shows High Molecular Chemical Company Ltd., under the trade name of "Binylol 2200"), (ii) 1% by weight of aluminum powder and (iii) 39% by weight of diethyl carbitol were mixed together and dissolved. As a result, a hot-setting adhesive suspension (i+ii+iii) having a suitable viscosity was prepared for coating. After applying the hot-setting adhesive suspension to all over the other side of the above film by screen printing process, the resulting thin layer of said adhesive suspension on said film was dried at the temperature of 110° C. for 10 minutes (step (B)).

Subsequently, as shown in FIG. 3, a rectangular piece 11 having the size of 7.0 mm in width (B') and 52.4 mm in length (A') was cut out of the resulting film having an adhesive coating layer on its surface.

As shown in FIG. 4, a length of film, with the adhesive layer 12 coated on the upper side thereof was then placed on a flat iron plate 13 heated at the temperature of 130° C., and a silicone rubber tube 15 having the size of 2.0 mm in outer diameter and 0.5 mm in inner diameter was rolled on side film 11 in the direction of said strips 10 printed on the lower side so as to adhere said film 11 around the rubber tube 15. In this case, as shown in FIG. 4, the rubber tube 15 may be easily rolled down and adhesive layer 12 (the surface in the figure) of the film 11 by using a guide glass plate 14 with an angle of inclination in the same manner as Example 1 (step (D)).

Thus, the tube 16 obtained in this step had electric resistance of 0.5 kΩ, sufficient elasticity in the direction of its diameter, and excellent properties of electrode connector for liquid crystal display device. In practice, it was favorably suitable for use of electrode connector for liquid crystal display device.

In addition, instead of the above-mentioned polyurethane resin in step (A), chloroprene rubber (manufactured by Showa Neoprene K.K. under the trade name "WRT"), chlorosulphonated rubber (manufactured by E. I. DuPont de Nemours & Company U.S.A. under the trade name "Hypalon No. 30") and ethylene-vinyl acetate copolymer resin (manufactured by Seitetsu Chemical Company Ltd., under the trade name "Flowback D-5010") may be used with substantially similar effect.

EXAMPLE 5

(a) 40% by weight of graphite powder having a grain size of 0.1–60μ and 20% by weight of carbon black powder having a grain size of less than 0.1μ, (b) 20% by weight of polyurethane resin, namely manufactured by Nippon Urethane Company Ltd., under the trade name of "Parapren 25S", and (c) 20% by weight of isophorone were mixed together and dissolved. As a result, a suspension (a+b+c) was prepared as the special dispersed ink having a suitable viscosity for printing. As shown in FIG. 2, with the resulting ink a plurality of parallel electroconductive strips with a predetermined width and interval, namely circuit patterns for the electrode connector were printed on one side of a sheet of polyester film with thickness 25μ by the conventional screen printing process, and the above ink was dried at the temperature of 100° C. for 15 minutes (step (A)).

(i) 50% by weight of ethylene-vinyl acetate copolymer resin (manufactured by Seitetsu Chemical Company Ltd. under the trade name of "Flowback D-5010"), (ii) 5% by weight of aluminum powder and (iii) 45% by weight of toluene were mixed together and dissolved. As a result, a hot-setting adhesive suspension (i+ii+iii) having a suitable viscosity was prepared for coating. After applying the hot-setting adhesive suspension to all over the other side of the above film by screen printing process, the resulting thin layer of said adhesive suspension on said film was dried at the temperature of 110° C. for 10 minutes (step (B)).

Subsequently, as shown in FIG. 3, a rectangular piece 11 having the size of 7.0 mm in width (B') and 52.4 mm in length (A') was cut out of the resulting film having an adhesive coating layer on the surface in the step of (B) (step (C)).

At last, as shown in FIG. 4, a length of film 11 with the adhesvie layer 12 coated on the upper side thereof was put on a flat iron plate 13 heated at the temperature of 120° C., and a silicone rubber tube 15 having the size of 2.0 mm in outer diameter and 0.5 mm in inner diameter was rolled on said film 11 in the longitudinal direction of said strips 10 printed on the lower side so as to adhere said film 11 around the rubber tube 15. In this case, as shown in FIG. 4, the rubber tube 15 may be easily rolled down and adhesive layer 12 (the surface in the figure) of the film 11 by using a guide glass plate 14 with an angle of inclination in the same manner as Example 1 (step (D)).

Thus, the tube 16 obained in this step had electric resistance of 0.9 kΩ, sufficient elasticity in the direction of its diameter, and excellent properties of electrode connector for liquid crystal display device.

Moreover, instead of the above mentioned (b) polyurethane resin in the step of (A), chloroprene rubber (manufactured by Showa Neoprene K.K. under the trade name "WRT"), chlorosulphonated rubber (manufactured by E. I. DuPont de Nemours & Company U.S.A. under the trade name of "Hypalon No. 30") and ethylene-vinyl acetate copolymer resin (manufactured by Seitetsu Chemical Company Ltd., under the trade name "Flowback D-5010") may be used with substantially similar effect.

EXAMPLE 6

Figure 5:
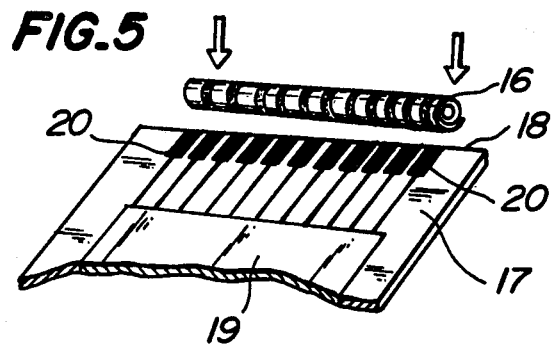
FIG. 5 shows schematically a perspective view of an electrode connector according to an embodiment of the invention, which is adapted to apply to the terminal strips of a liquid crystal display device.

In the above Example 1, as shown in FIGS. 4–6, a cylindrical or tubular electrode connector having a circular section was obtained in the steps [(A)+(B)+(C)+(D)] according to the invention.

In addition, after the above cylindrical or tubular electrode connector was put on a stainless steel plate heated at the temperature of 150° C., it was hot-pressed laterally by using a thickness gauge of thickness 1.6 mm (not shown in the figure) and molded into a cylindrical electrode connector having an elliptic section as shown in FIGS. 7 and 8 (step (E)).

Thus, the tube 21 obtained in this step had a major axis of 2.3 mm and a minor axis of 1.7 mm in the elliptic section, and had electric resistnace of 1.0 KΩ, sufficient elasticity in the directions of their axes, and excellent properties of electrode connector for liquid crystal display device. In practice, it was favorably suitable for use of electrode connector for liquid crystal display device.

Moreover, instead of the above-mentioned (b) polyurethane resin in the step of (A), chloroprene rubber (manufactured by Showa Neoprene K.K. under the trade name "WRT"), chlorosulphonated rubber (manufactured by E. I. DuPont de Nemours & Company U.S.A. under the trade name of "Hypalon No. 30") and ethylene-vinyl acetate copolymer resin (manufactured by Seitetsu Chemical Company Ltd., under the trade name of "Flowback D-5010") may be used with substantially similar effect.

EXAMPLE 7

In the above Example 2, as shown in FIGS. 4–6, a cylindrical electrode connector having a circular section was obtained in the steps (A)–(D) according to the invention.

In addition, after the above cylindrical electrode connector was put on a stainless steel plate heated at the temperature of 120° C., it was hot-pressed laterally by using a thickness gauge of thickness 1.6 mm (not shown in the figure) and molded into a cylindrical electrode connector having an elliptic section as shown in FIGS. 7 and 8 (step (E).

Thus, the tube 21 obtained in this step had a major axis of 2.3 mm and a minor axis of 1.7 mm in the elliptic section, and had electric resistance of 0.8 kΩ, sufficient elasticity in the directions of their axes, and excellent properties of electrode connector for liquid crystal display device. In practice, it was favorably suitable for use of electrode connector for liquid crystal display device.

Moreover, instead of the above-mentioned (B) polyurethane resin in the step of (A), chloroprene rubber (manufactured by Showa Neoprene K.K. under the trade name "WRT"), chlorosulphonated rubber (manufactured by E. I. DuPont de Nemours & Company U.S.A. under the trade name of "Hypalon No. 30") and ethylene-vinyl acetate copolymer resin (manufactured by Seitetsu Chemical Company Ltd., under the trade name "Flowback D-5010") may be used with substantially similar effect.

EXAMPLE 8

In the above Example 3, as shown in FIGS. 4–6 a cylindrical electrode connector having a circular section was obtained in the steps (A)–(D) according to the invention.

In addition, after the above cylindrical electrode connector was put on a stainless steel plate heated at the temperature of 170° C., it was hot-pressed laterally by using a thickness gauge of thickness 1.6 mm (not shown in the figure) and molded into a cylindrical electrode connector having an elliptic section as shown in FIGS. 7 and 8 (step (E)).

Thus, the tube 21 obtained in this step has a major axis of 2.3 mm and a minor axis of 1.7 mm in the elliptic section, and has electric resistance of 0.6 KΩ, sufficient elasticity in the directions of their axes, and excellent properties of electrode connector for liquid crystal display device.

Moreover, instead of the above-mentioned (b) polyurethane resin in the step of (A), chloroprene rubber (manufactured by Showa Neoprene K.K. under the trade name "WRT"), chlorosulphonated rubber (manufactured by E. I. DuPont de Nemours & Company U.S.A. under the trade name "Hypalon No. 30") and ethylene-vinyl acetate copolymer resin (manufactured by Seitetsu Chemical Compnay Ltd., under the trade name "Flowback D-5010") may be used with substantially similar effect.

EXAMPLE 9

This Example 9 has the same steps of (A)–(C) as the above-mentioned Example 4 in the method according to the invention.

In the step of (D), it was only different from the above Example 4 that the silicone rubber tube 15 having the size of 4.0 mm in outer diameter and 2.0 mm in inner diameter was used.

Thus, as shown in FIGS. 4–7, a cylindrical electrode connector having a circular section was obtained in the steps (A)–(D) according to the invention.

In addition, after the above cylindrical electrode connector was put on a stainless steel heated at the temperature of 100° C., it was hot-pressed laterally by using a thickness gauge of thickness 2.5 mm (not shown in the figure) and molded into a cylindrical electrode connector having an elliptic section as shown in FIGS. 7 and 8 (step (E)).

Thus, the tube 21 obtained in this step had a major axis of 4.8 mm and a minor axis of 2.6 mm in the elliptic section, and has electric resistance of 0.5 kΩ, sufficient elasticity in the directions of their axes, and excellent properties of electrode connector for liquid crystal display device.

Moreover, instead of the above-mentioned (b) polyurethane resin in the step of (A), chloroprene rubber (manufactured by Showa Neoprene K.K. under the trade name "WRT"), chlorosulphonated rubber (manufactured by E. I. DuPont de Nemours & Company U.S.A. under the trade name "Hypalon No. 30") and ethylene-vinyl acetate copolymer resin (manufactured by Seitetsu Chemical Company Ltd., under the trade name "Flowback D-5010") may be used with substantially similar effect.

EXAMPLE 10

In this example steps (A)–(C) were the same as in Example 5.

Step (D) was different from Example 5 in that the silicone rubber tube 15 has an outer diameter of 4.0 mm and 2.0 mm in inner diameter.

Thus, as shown in FIGS. 4–6, a cylindrical electrode connector having a circular section was obtained using steps (A)–(D) according to the invention.

In addition, after the above cylindrical electrode connector was put on a stainless steel heated at the temperature of 105° C., it was hot-pressed laterally by using a thickness gauge of thickness 2.5 mm (not shown in the figure) and molded into a cylindrical electrode connector having an elliptic section as shown in FIGS. 7 and 8 (step (E)).

Thus, the tube 21 obtained in this step had a major axis of 4.8 mm and a minor axis of 2.6 mm in the elliptic section, and had an electric resistance of 0.9 kΩ, sufficient elasticity in the directions of their axes, and excellent properties of electrode connector for liquid crystal display device.

Moreover, instead of the above-mentioned polyurethane resin in step (A), chloroprene rubber (manufactured by Showa Neoprene K.K. under the trade name "WRT"), chlorosulphonated rubber (manufactured by E. I. DuPont de Nemours & Company U.S.A. under the trade name "Hypalon No. 30") and ethylene-vinyl acetate copolymer resin (manufactured by Seitetsu Chemical Company Ltd., under the trade name "Flowback D-5010") may be used with substantially similar results.

EXAMPLE 11

(a) 40% by weight of graphite powder having a grain size of 0.1–60μ and 20% by weight of silver powder having a grain size of 0.1–60μ, (b) 20% by weight of chloroprene rubber manufactured by Showa Neoprene K.K. under the trade name of "WRT" and (c) 20% by weight of isophorone were mixed together and dissolved. As a result, a suspension (a+b+c) was prepared as the special dispersed ink having a suitable viscosity for printing. As shown in FIG. 2, with the resulting ink a plurality of parallel electroconductive strips with a predetermined width and spacing, in the form of circuit patterns for the electrode connector were printed on one side of a sheet of polyester film having a thickness of 25μ by the conventional screen printing process, and the above ink was dried at the temperature of 100° C. for 15 minutes (step (A)).

Next, after applying the same hot-setting adhesive suspension (i+ii+iii) as in Example 1 to all over the other side of the above film by screen printing, the resulting thin layer of adhesive suspension on said film was dried at a temperature of 110° C. for 10 minutes (step (B)).

Subsequently, as shown in FIG. 3, a rectangular piece 11 having the size of 7.0 mm in width (B') and 52.4 mm in length (A') was cut out of the resulting film having the adhesive coating layer on its surface.

Then, as shown in FIG. 4, a length of film 11 with the adhesive layer 12 coated on the upper side thereof was put on a flat iron plate 13 heated to a temperature of 104° C., and a silicone rubber tube 15 having the size of 4.0 mm in outer diameter and 2.0 mm in inner diameter was rolled on said film 11 in the longitudinal direction of said strips 10 printed on the lower side so as to adhere said film 11 around the rubber tube 15. As shown in FIG. 4, the rubber tube 15 may be easily rolled down and adhered to the hot-setting adhesive layer 12 (the surface in the figure) of the film 11 by using a guide glass plate 14 with an angle of inclination (step (D)).

As a last step, after the above cylindrical electrode connector was put on a stainless steel plate heated to a temperature of 150° C., it was hot-pressed laterally by using a thickness gauge of thickness 2.5 mm ( not shown in the figure) and molded into a cylindrical electrode connector having an elliptic section as shown in FIGS. 7 and 8 (step (E)).

Thus, the tube 21 obtained in this step had a major axis of 4.8 mm and a minor axis of 2.6 mm in the elliptic section, and had an electric resistance of 0.7 kΩ, sufficient elasticity in the directions of their axes, and excellent properties of electrode connector for liquid crystal display device. It was thus suitable for use as an electrode connector for liquid crystal display device.

Moreover, instead of the chloroprene rubber in step (A), polyurethane resin (manufactured by Shows High Molecular Company Ltd. under the trade name of "Binylol 2200"), chlorosulphonated rubber (manufactured by E. I. DuPont de Nemours & Company U.S.A. under the trade name of "Hypalon No. 30 "), and ethylene-vinyl acetate copolymer resin (manufactured by Seitetsu Chemical Company Ltd. under the trade name of "Flowback D-5010") may be used with substantially similar results.

EXAMPLE 12

(a) 40% by weight of graphite powder having a grain size of 0.1–60μ and 20% by weight of carbon black powder having a grain size of less than 0.1μ, (b) 20% by weight of chloroprene rubber manufactured by Showa Neoprene K.K. under the trade name of "WRT," and (c) 20% by weight of dimethyl formamide were mixed together and dissolved. As a result, a suspension (a+b+c) was prepared for use as dispersed ink having a suitable viscosity for printing. As shown in FIG. 2, with the resulting ink a plurality of parallel electroconductive strips with a predetermined width and spacing in the form of circuit patterns for the electrode connector were printed on one side of a sheet of polyester film having a thickness of 25μ by conventional screen printing and the ink was dried at the temperature of 110° C. for 15 minutes (step (A)).

Next, after applying the same hot-setting adhesive suspension (i+ii+iii) as in Example 2 all over the other side of the film by screen printing, the resulting thin layer of said adhesvie suspension on said film was dried at a temperature of 110° C. for 10 minutes (step (B)).

Subsequently, as shown in FIG. 3, a rectangular piece 11 having the size of 7.0 mm in width (B') and 52.4 mm in length (A') was cut out of the resulting film having an adhesive coating layer on its surface.

Thus, as shown in FIG. 4, a length of film 11 with the adhesive layer 12 coated on the upper side thereof was put on a flat iron plate 13 heated at a temperature of 110° C., and a silicone rubber tube 15 having the size of 4.2 mm in outer diameter and 2.0 mm in inner diameter was rolled on said film 11 in the longitudinal direction of said strips 10 printed on the lower side so as to adhere said film 11 around the rubber tube (step (D)).

As a last step, after the above cylindrical electrode connector was put on a stainless steel plate heated at the temperature of 120° C., it was hot-pressed laterally by using a thickness gauge of thickness 2.5 mm (not shown in the figure) and molded into a cylindrical electrode connector having an elliptic section as shown in FIGS. 7 and 8 (step (E)).

Thus, the tube 21 obtained in this step had a major axis of 4.8 mm and a minor axis of 2.6 mm in the elliptic section, and had an electrode resistance of 0.9 kΩ, sufficient elasticity in the directions of their axes, and excellent properties of electrode connector for liquid crystal display device. In practice, it was suitable for use as electrode connector for liquid crystal display device.

Moreover, instead of the above-mentioned chloroprene rubber in step (A), polyurethane resin (manufactured by Showa High Molecular Company Ltd. under the trade name of "Binylol 2200"), chlorosulphonated rubber (manufactured by E. I. Du Pont de Nemours & Company U.S.A. under the trade name of "Hypalon No. 30") and ethylene-vinyl acetate copolymer resin (manufactured by Seitetsu Chemical Company Ltd. under the trade name of "Flowback D-5010") may be used with substantially similar results.

EXAMPLE 13

(a) 30% by weight of graphite powder having a grain size of 0.1–60μ and 15% by weight of carbon black powder having a grain size of less than 0.1μ, (b) 25% by weight of chlorosulphonated rubber manufactured by E. I. Du Pont de Nemours & Company U.S.A under the trade name of "Hypalon No. 30," and (c) 30% by weight of butyl carbitol were mixed together and dissolved. As a result, a suspension (a+b+c) was prepared as the special dispersed ink having a suitable viscosity for printing. As shown in FIG. 2, with the resulting ink a plurality of parallel electroconductive strips with a predetermined width and spacing in the form of circuit patterns for the electrode connector were printed on one side of a sheet of polyester film having a thickness of 25μ by the conventional screen printing, and the ink was dried at a temperature of 100° C. for 15 minutes (step (A)).

Next, after applying the same hot-setting adhesive suspension (i+ii+iii) as in Example 2 all over the other side of the film by gravure printing, the resulting thin layer of said adhesive suspension on the film was dried at a temperature of 110° C. for 10 minutes (step (B)).

Subsequently, as shown in FIG. 3, a rectangular piece 11 having the size of 7.0 mm in width (B') and 52.4 mm in length (A') was cut out of the resulting film having an adhesive coating layer on its surface.

Thus, as shown in FIG. 4, a length of film 11 with the adhesive layer 12 coated on the upper side thereof was put on a flat iron plate 13 heated to a temperature of 110° C., and a silicone rubber tube 15 having the size of 3.0 mm in outer diameter and 1.5 mm in inner diameter was rolled on said film 11 in the longitudinal direction of said strip 10 printed on the lower side as to adhere said film 11 around the rubber tube 15 (step (D)).

As a last step, after the above cylindrical electrode connector was put on a stainless steel plate heated to a temperature of 170° C., it was hot-pressed laterally by using a thickness gauge of thickness 1.0 mm (not shown in the figure) and molded into a cylindrical electrode connector having an elliptic section as shown in FIGS. 7 and 8 (step (E)).

Thus, the tube 21 obtained in this step had a major axis of 4.0 mm and a minor axis of 1.1 mm in the elliptic section, and had an electric resistance of 1 kΩ, sufficient elasticity in the directions of their axes, and excellent properties of electrode connector for liquid crystal display device. In practice, it was suitable for use as electrode connector for liquid crystal display device.

Moreover, instead of the chlorosulphonated rubber in step (A), polyurethane resin (manufactured by Showa High Molecular Company Ltd. under the trade name of "Binylol 2200"), and chloroprene rubber (manufactured by Showa Neoprene K.K. under the trade name of "WRT") may be used with substantially similar effect.

EXAMPLE 14

(a) 20% by weight of graphite powder having a grain size of 0.1-60μ and 40% by weight of silver powder having a grain size of 0.1-60μ, (b) 20% by weight of chlorosulphonated rubber manufactured by E. I. Du Pont de Nemours & Company U.S.A. under the trade name of "Hypalon" No. 30", and (c) 20% by weight of isophorone were mixed together and dissolved. As a result, a suspension (a+b+c) was prepared for use as special dispersed ink having suitable viscosity for printing. As shown in FIG. 2, with the resulting ink a plurality of parallel electroconductive strips with a predetermined width and spacing in the form of circuit patterns for the electrode connector were printed on one side of a sheet of polyester film having a thickness of 25μ by conventional screen printing, and the ink was dried at a temperature of 100° C. for 15 minutes (step (A)).

Next, after applying the same hot-setting adhesive suspension (i+ii+iii) as in Example 5 all over the other side of the film by spraying, the resulting thin layer of adhesive suspension on the film was dried at a temperature of 110° C. for 10 minutes (step (B)).

Subsequently, as shown in FIG. 3, a rectangular piece 11 having the size of 7.0 mm in width (B') and 52.4 mm in length (A') was cut out of the resulting film having an adhesive coating layer on its surface.

Thus, as shown in FIG. 4, a length of film 11 with the adhesive layer 12 coated on the upper side thereof was put on a flat iron plate 13 heated at a temperature of 120° C., and a silicone rubber tube 15 having the size of 3.0 mm in outer diameter and 1.5 mm in inner diameter was rolled on said film 11 in the longitudinal direction of said strips 10 printed on the lower side so as to adhere said film 11 around the rubber tube 15 (step (D)).

At last, after the above cylindrical electrode connector was put on a stainless steel plate heated at the temperature of 100° C., it was hot-pressed laterally by using a thickness gauge of thickness 1.0 mm (not shown in the drawing) and molded into a cylindrical electrode connector having an elliptic section as shown in FIGS. 7 and 8 (step (E)).

Thus, the tube 21 obtained in this step had a major axis of 4.0 mm and a minor axis of 1.1 mm in the elliptic section, and had an electric resistance of 0.8 kΩ, sufficient elasticity in the directions of their axes, and excellent properties of electrode connector for liquid crystal display device and was thus suitable for use as electrode connector for liquid crystal display device.

Moreover, instead of the chlorosulphonated rubber in step (A), polyurethane resin (manufactured by Showa High Molecular Company Ltd. under the trade name of "Binylol 2200"), chloroprene rubber (manufactured by Showa Neoprene K.K. under the trade name of "WRT"), and ethylene-vinyl acetate copolymer resin (manufactured by Seitetsu Chemical Company Ltd. under the trade name of "Flowback D-5010") may be used with substantially similar results.

EXAMPLE 15

(a) 10% by weight of graphite powder having a grain size of 0.1-60μ and 50% by weight of silver powder having a grain size of 0.1-60μ, (b) 20% by weight of ethylene-vinyl acetate copolymer resin manufactured by Seitetsu Chemical Company Ltd. under the trade name "Flowback D-5010," and (c) 20% by weight of butyl carbitol were mixed together and dissolved. As a result, a suspension (a+b+c) was prepared for use as special dispersed ink having suitable viscosity for printing. As shown in FIG. 2, with the resulting ink a plurality of parallel electroconductive strips with a predetermined width and spacing in the form of circuit patterns for the electrode connector were printed on one side of a sheet of polyester film having a thickness of 25μ by conventional screen printing, and the ink was dried at a temperature of 100° C. for 15 minutes (step (A)).

Next, after applying the same hot-setting adhesive suspension (i+ii+iii) as in Example 3 all over the other side of the above film by screen printing, the resulting thin layer of said adhesive suspension on said film was dried at a temperature of 110° C. for 10 minutes (step (B)).

Subsequently, as shown in FIG. 3, a rectangular piece 11 having the size of 7.0 mm in width (B') and 52.4 mm in length (A') was cut out of the resulting film having an adhesive coating layer on its surface.

Thus, as shown in FIG. 4, a length of film 11 with the adhesive layer 12 coated on the upper side thereof was put on a flat iron plate 13 heated at a temperature of 150° C., and a silicone rubber tube 15 having the size of 2.0 mm in outer diameter and 1.0 mm in inner diameter was rolled on said film 11 in the longitudinal direction of said strips 10 printed on the lower side so as to adhere said film 11 around the rubber tube 15 (step (D)).

At last, after the above cyrlindrical electrode connector was put on a stainless steel plate heated at a temperature of 160° C., it was hot-pressed laterally by using a thickness gauge of thickness 1.0 mm (not shown in the figure) and molded into a cylindrical electrode connector having an elliptic section as shown in FIGS. 7 and 8 (the step (E)).

Thus, the tube 21 obtained in this step had a major axis of 2.7 mm and a minor axis of 1.1 mm in the elliptic section, and had electric resistance of 0.5 kΩ, sufficient elasticity in the directions of their axes, and excellent properties of electrode connector for liquid crystal display device. In practice, it was suitable for use as electrode connector for liquid crystal display device.

Moreover, instead of the ethylene-vinyl acetate copolymer resin in step (A), polyurethane resin (manufactured by Showa High Molecular Company Ltd. under the trade name of "Binylol 2200"), chloroprene rubber (manufactured by Showa Neoprene K.K. under the trade name of "WRT"), and chlorosulphonated rubber (manufactured by E. I. Du Pont de Nemours & Company U.S.A. under the trade name of "Hypalon No. 30") may be used with substantially similar results.

EXAMPLE 16

(a) 20% by weight of graphite powder a grain size of 0.1-60μ, (b) 20% by weight of ethylene-vinyl acetate copolymer resin, and (c) 20% by weight of isophorone were mixed together and dissolved. As a result, a suspension (a+b+c) was prepared for use as special dispersed ink having a suitable viscosity for printing. As shown in FIG. 2, with the resulting ink a plurality of parallel electroconductive strips with a predetermined width and spacing in the form of circuit patterns for the electrode connector were printed on one side of a sheet of polyester film having a thickness of 25μ by conventional screen printing, and the above ink was dried at a temperature of 100° C. for 15 minutes (step (A)).

Next, after applying the same hot-setting adhesive suspension (i+ii+iii) as in Example 4 to all the other side of the film by screen printing, the resulting thin layer of said adhesive suspension on said film was dried at a temperature of 110° C. for 10 minutes (step (B)).

Subsequently, as shown in FIG. 3, a rectangular piece 11 having the size of 7.0 mm in width (B') and 52.4 mm in length (A') was cut out of the resulting film having an adhesive coating layer on its surface.

Thus, as shown in FIG. 4, a length of film 11 with the adhesive layer 12 coated on the upper side thereof was put on a flat iron plate 13 heated at a temperature of 130° C., and a silicone rubber tube 15 having the size of 2.0 mm in outer diameter and 1.0 mm in inner diameter was rolled on said film 11 in the longitudinal direction of said strips 10 printed on the lower side so as to adhere said film 11 around the rubber tube 15 (step (D)).

At last, after the above cylindrical electrode connector was put on a stainless steel plate heated at the temperature of 120° C., it was hot-pressed laterally by using a thickness gauge of thickness 1.0 mm (not shown in the figure) and molded into a cylindrical electrode connector having an elliptic section as shown in FIGS. 7 and 8 (step (E)).

Thus, the tube 21 obtained in this step had a major axis of 2.7 mm and a minor axis of 1.1 mm in the elliptic section, and had an electric resistance of 0.8 kΩ, sufficient elasticity in the directions of their axes, and excellent properties of electrode connector for liquid crystal display device and was thus suitable for use as electrode connector for liquid crystal display device.

Moreover, instead of the ethylene-vinyl acetate copolymer resin in step (A), polyurethane resin (manufactured by Showa High Molecular Company Ltd. under the trade name "Binylol 2200"), chloroprene rubber (manufactured by Showa Neoprene K.K. under the trade name of "WRT"), and chlorosulphonated rubber (manufactured by E. I. Du Pont de Nemours & Company U.S.A. under the trade name of "Hypalon No. 30") may be used with substantially similar results.

Having now fully described the invention, it will be apparent to one of ordinary skill in the art that any changes and modifications can be made without departing from the spirit and scope of the invention.

What is claimed is:

1. A method of forming an electrode connector for liquid crystal display device comprising the steps of:
   (A) printing a plurality of parallel electroconductive strips with a predetermined width and spacing for the electrode connector on one side of a sheet of flexible polyester film with a special suspension ink consisting essentially of (a) 20–80% by weight of at least one fine powder selected from the group consisting of graphite powder having a grain size of 0.1–60μ, carbon black powder having a grain size of less than 0.1μ and silver powder having a grain size of 0.1–60μ, (b) 5–30% by weight of at least one binding material of rubber and thermoplastic resin selected from the group consisting of chloroprene rubber, chlorosulphonated rubber, polyurethane resin and polyester resin and (c) 15–80% by weight of at least one organic solvent selected from the group consisting of dimethyl formamide, dimethyl acetamide, diethyl carbitol, butyl carbitol, isophorone and turpentine oil, and having an apparent specific gravity of 0.9–1.9 and an apparent viscosity of 150–1,200 poise, and drying the printed ink on said polyester film;
   (B) applying a hot-setting adhesive suspension consisting essentially of (i) 30–60% by weight of at least one hot-setting adhesive resin selected from the group consisting of chloroprene rubber-phenol resin, ethylene-vinyl acetate copolymer resin and polyester resin, (ii) 1–10% by weight of at least one fine powder selected from the group consisting of aluminum powder, iron oxide powder and sericite powder and (iii) 30–70% by weight of at least one organic solvent selected from the group consisting of toluene, xylene, ethyl acetate, isophorone, butyl carbitol and diethyl carbitol, and having an apparent specific gravity of 0.9–1.3 and an apparent viscosity of 100–800 poise to all over another side of said polyester film by spraying, and drying a thin layer of said adhesive suspension on said polyester film;
   (C) cutting a rectangular piece having the desired size out of the resulting film having an adhesive coating layer on the surface in the step of (B); and
   (D) putting a length of film with the adhesive layer coated on the upper side thereof on a flat plate heated at the temperature of 100° C.–200° C., and rolling a rubber tube consisting essentially of silicone rubber, chloroprene rubber or natural rubber, and having the size of 1.0–4.0 mm in outer diameter, 0.5–2.0 mm in inner diameter and 10–100 mm in length on said film in contact with the adhesive and in the direction of said vertical strips printed on the lower side so as to adhere said film around said rubber tube.

2. A method of forming an electrode connector for liquid crystal display device comprising the steps of:
   (A) printing a plurality of parallel electroconductive strips with a predetermined width and spacing for the electrode connector on one side of a sheet of flexible polyester film with a special suspension ink consisting essentially of (a) 20–80% by weight of at least one fine powder selected from the group consisting of graphite powder having a grain size of 0.1–1.60μ, carbon black powder having a grain size of less than 0.1μ and silver powder having a grain size of 0.1–60μ, (b) 5–30% by weight of at least one binding material of rubber and thermoplastic resin selected from the group consisting of chloroprene rubber, chlorosulphonated rubber, polyurethane resin and polyester resin and (c) 15–80% by weight of at least one organic solvent selected from the group consisting of dimethyl formamide, dimethyl acetamide, diethyl carbitol, butyl carbitol, isophorone and turpentine oil, and having an apparent specific gravity of 0.9–1.9 and an apparent viscosity of 150–1,200 poise, and drying the printed ink on said polyester film;
   (B) applying a hot-setting adhesive suspension consisting essentially of (i) 30–60% by weight of at least one hot-setting adhesive resin selected from the group consisting of chloroprene rubber-phenol resin, ethylene-vinyl acetate copolymer resin and polyester resin, (ii) 1–10% by weight of at least one fine powder selected from the group consisting of aluminum powder, iron oxide powder and sericite powder and (iii) 30–70% by weight of at least one organic solvent selected from the group consisting of toluene, xylene, ethyl acetate, isophorone, butyl carbitol and diethyl carbitol, and having an apparent specific gravity of 0.9–1.3 and an apparent viscosity of 100–800 poise to all over another side of said polyester film by spraying, and drying a thin layer of said adhesive suspension on said polyester film;

(C) cutting a rectangular piece having the desired size out of the resulting film having an adhesive coating layer on the surface in the step of (B); and (D) putting a length of film with the adhesive layer coated on the upper side thereof on a flat plate heated at the temperature of 100° C.–200° C., and rolling a rubber tube consisting essentially of silicone rubber, chloroprene rubber or natural rubber, and having the size of 1.0–4.0 mm in outer diameter, 0.5–2.0 mm in inner diameter and 10–100 mm in length on said film in contact with the adhesive and in the direction of said vertical strips printed on the lower side so as to adhere said film around said rubber tube; and (E) laterally hot-pressing said cylindrical electrode connector obtained in step (D) on a hot plate heated at the temperature of 100° C.–200° C. so as to mold into a cylindrical electrode connector having a desired thickness in an elliptic section by using a thickness gauge.

* * * * *